(12) United States Patent
Laurier et al.

(10) Patent No.: US 9,003,178 B2
(45) Date of Patent: Apr. 7, 2015

(54) METHOD OF CHECKING AND PROTECTING DATA AND IDENTITY ESPECIALLY WITHIN PROCESSES USING INFORMATION AND COMMUNICATION TECHNOLOGIES

(75) Inventors: Philippe Laurier, ST-Pierre des Corps (FR); Michel Riguidel, Paris (FR)

(73) Assignee: Institut Mines-Telecom, Paris (FR)

( * ) Notice: Subject to any disclaimer, the term of this patent is extended or adjusted under 35 U.S.C. 154(b) by 193 days.

(21) Appl. No.: 13/701,462

(22) PCT Filed: Jun. 1, 2011

(86) PCT No.: PCT/EP2011/059068
§ 371 (c)(1),
(2), (4) Date: Feb. 12, 2013

(87) PCT Pub. No.: WO2011/151388
PCT Pub. Date: Dec. 8, 2011

(65) Prior Publication Data
US 2013/0212375 A1    Aug. 15, 2013

(30) Foreign Application Priority Data
Jun. 1, 2010 (FR) ..................... 10 54272

(51) Int. Cl.
| | |
|---|---|
| H04L 29/06 | (2006.01) |
| G06F 21/60 | (2013.01) |
| G06F 21/62 | (2013.01) |
| H04L 12/24 | (2006.01) |
| H04L 9/00 | (2006.01) |
| H04L 29/00 | (2006.01) |

(52) U.S. Cl.
CPC .......... *H04L 63/0407* (2013.01); *G06F 21/606* (2013.01); *G06F 21/6209* (2013.01); *G06F 21/6245* (2013.01); *G06F 21/6254* (2013.01); *H04L 63/0853* (2013.01); *H04L 41/28* (2013.01); *H04L 29/06047* (2013.01); *H04L 41/0803* (2013.01); *H04L 29/06* (2013.01); *H04L 9/00* (2013.01); *H04L 63/00* (2013.01); *H04L29/00* (2013.01); *G06F 2221/2115* (2013.01); *H04L 63/102* (2013.01)

(58) Field of Classification Search
CPC ... H04L 29/00; H04L 29/06; H04L 29/06047; H04L 41/0803; H04L 41/28; H04L 63/00; H04L 9/00
USPC ........................................................ 713/150
See application file for complete search history.

(56) References Cited

U.S. PATENT DOCUMENTS

| | | | | |
|---|---|---|---|---|
| 7,840,813 | B2* | 11/2010 | Canard et al. ................. | 713/176 |
| 2009/0024850 | A1* | 1/2009 | Halcrow et al. ............... | 713/175 |

(Continued)

FOREIGN PATENT DOCUMENTS

| | | |
|---|---|---|
| FR | 2932043 A1 | 12/2009 |
| WO | 2009/147163 A1 | 12/2009 |

*Primary Examiner* — Krisna Lim
(74) *Attorney, Agent, or Firm* — Baker & Hostetler LLP

(57) ABSTRACT

A method of checking and protecting data and identities within a communication or computing process between at least one author and at least one recipient comprises at least: a step of allocation by an anonymization authority of one and the same stamp forming a cryptonymic marking, to one or to several different authors and to their objects; a step of inserting said stamp into the communication or computing protocol associated with the data stream, by means of a stamp system, the protocol containing the identity of said author or of said object of the author or authors, and each author being able moreover to simultaneously have a plurality of different cryptonyms; a step of reading, at at least one recipient, of said protocol by means of a reading system able to detect the presence of said stamp.

14 Claims, 3 Drawing Sheets

(56) References Cited

U.S. PATENT DOCUMENTS

| | | | |
|---|---|---|---|
| 2009/0158030 A1* | 6/2009 | Rasti | 713/156 |
| 2009/0228582 A1* | 9/2009 | White et al. | 709/224 |
| 2010/0017615 A1* | 1/2010 | Boesgaard Sorensen | 713/176 |
| 2010/0318797 A1* | 12/2010 | King et al. | 713/168 |
| 2011/0307691 A1 | 12/2011 | Riguidel et al. | |

* cited by examiner

METHOD OF CHECKING AND PROTECTING DATA AND IDENTITY ESPECIALLY WITHIN PROCESSES USING INFORMATION AND COMMUNICATION TECHNOLOGIES

CROSS-REFERENCE TO RELATED APPLICATIONS

This application is a National Stage of International patent application PCT/EP2011/059068, filed on Jun. 1, 2011, which claims priority to foreign French patent application No. FR 1054272, filed on Jun. 1, 2010, the disclosures of which are incorporated by reference in their entirety.

FIELD OF THE INVENTION

The present invention relates to a method of checking, securing and protecting data within declarative, informative, administrative or productive processes using information technology and communication technology. This backdrop defines ways of being able optionally to ascertain these data, to access them or transmit them. It relates to a method of managing and diminishing digital identities by inserting intermediate markings forming a screen or modification and by substituting identity referents.

It applies to the management of data governed by computing or communication protocols, notably to jointly facilitate the management and the anonymization of goods or persons furnished with digital identities, such as so-called intelligent and communicating objects.

The invention is aimed, through these checking and protection actions, at better respect for the private life of persons and their "digital privacy". The entity concerned may be a physical or legal person.

It may involve objects, or groups of objects, or an object coupled with a person for example, and which has taken on identities, notably within the framework of so-called communicating objects, in the manner of a prosthesis with an electronic perspective.

BACKGROUND AND SUMMARY OF THE INVENTION

Here, the word "data" encompasses a spectrum ranging from the analog signal to the structured shaping of digital data in the form of information or of directives. The distinctive criterion of the present invention, for its operation, being that this datum is conveyed or preserved within a framework, considered to be the container, which takes the form of a computing or communication protocol.

It may involve static data on their support, as long as access thereto, the integrity thereof or the implementation thereof depend as a prerequisite on a protocol.

Hereinafter the term "file" will connote a document or a computer program, an executable, a software entity, a virtual entity such as a virtual application.

The use of data in the case of a communication can occur for example upon an indication of site of presence via an electronic module situated in a transport vehicle or automatically by way of telecommunications via a central switchboard. The term dialog relates as much to an exchange on the conscious initiative of a person, as to one performed by one of his items of equipment, with or without express consent or compulsory relationship of ownership.

Hereinafter, the term "mail" will connote a message, a dispatching of a file or documents, a telephone call, a visit made by way of telecommunications, and more generally any form of stream, of sending or any form of exchange by linkup or connection.

Hereinafter, the term "author" will connote the sender of this mail. In the case of a passive component such as an RFID tag, the author will be the tag and its bearer, and not the module that created an electromagnetic field. In the case of communicating objects furnished with an identity, the author may be for example a sensor transmitting a signal, as well as its custodian or its bearer. In the case of a static computer file, the term author will be able to encompass, in addition to what or whoever designed it, what or whoever is the custodian, the depository or the manager thereof at the instant concerned.

The hardware support of the mail may be a communication network, notably a telecommunications or telebroadcasting network, as well as mobile physical means such as a USB key, a chip card or magnetic card, a disk, a badge, a ticket such as a subway ticket, a contact or contactless pass such as a transport card. As communicating objects become more commonplace, this field will be broadened to an infinity of supports that are less discernable in their contours but characterized by like functions and using computing or communication protocols.

The recipient object may be a support or a telecommunications or telebroadcasting terminal, and more generally any item of computing or electronic equipment able to participate in information distribution. Involving, as it does, the recipient of a mobile support for mail, this may be a computing machine furnished with sockets such as USB, a portable telephone, a digital assistant or diary, a card reader or disk reader, an automatic dispenser such as for banknotes, an access antechamber or else an identification module, by way of examples.

The invention structures and supports an interplay with several actors, among which are the author, the recipients, so-called anonymization authorities. Interplay which is deployed around a distinctive and characteristic sign inserted into the computing or communication protocol.

It can take the form of a triple device:
- on the one hand this marking by a characteristic sign, a so-called stamp, inserted for purposes of distinctiveness, of recognition, as well as transmission of directive or of information. This plurifunctional stamp, placed at the level of the computing or communication protocols, will serve, for a recipient, as information per se or as means for obtaining complementary information via the anonymization authority, optionally supplemented with a suitable device acting as cryptographic protocol for controlling access to instructions;
- on the other hand for partitioning and channeling the data or actors;
- the third device is to do with the fact that the stamp takes the form of a variable cryptonym, which can itself be linked on the one hand with an invariable and stable pseudonym, on the other hand with what will be termed polynyms, in a particular acceptation.

The present invention modifies, recomposes and broadens devices expressed in patent application FR 2 932 043 pertaining to a method of tracing and of resurgence of pseudonymized streams on communication networks, and method of sending information streams which is able to secure the data traffic and its addressees.

To this end, the invention relies notably in part on the system of distinctive and characteristic marking, inserted at the level of the protocol, and furnished with functional properties, such as described in patent application FR 2 932 043.

This characteristic sign is called a stamp, by analogy with the affixing of a stamped label in the guise of signature which personalizes but also in the guise of brand mark which modifies, signals and serves as exterior referencing sign. This term of marking, which also encompasses possible encapsulation, covers an operative mode consisting of an addition, a curtailment or a characteristic modification, on a protocol, while complying with the standard of this protocol. By way of examples, this may involve the tagging or watermarking of an IP packet, a steganographic marking or else the use of an additional protocol. This stamp takes on several statuses:

distinctive sign, on its reception or its observation by a third actor;
   recognition sign, during subsequent or parallel exchanges.

This dual status makes it possible, via the interplay of actors required to manipulate and interpret these stamps, to allocate them functionalities.

The general properties which stem therefrom for this system are:

functional;
   cryptonymic, in the guise of an author's stamped label affixed in a protocol, which designates it and identifies it, if necessary without naming it other than by an arbitrary convention.

To obtain the knowledge of the functions and of certain identity attributes concerned, it is necessary to liaise with an anonymization authority, whose informant role renders these two properties operative. The main joint usage of the functional and cryptonymic arrangements consists of a prohibition in relation to reading the identity of an author of a mail, such as it appears otherwise in the remainder of the protocol. This done, the device culminates in a masking stamp for this identity.

A second refinement with respect to the stamp of the protocol consists in varying its effects, in several ways:

It may involve simultaneously using, for one and the same author, several stamps, activatable by choice or according to defined usage charters that can be updated if necessary.
   Another way to vary the effects will consist in predefining them as a function of each interlocutor cataloged in advance.

A third refinement is to do with the fact that the number of stamp in a given protocol is no longer envisaged as a compulsory singular. Several of these distinctive signs will be possible simultaneously in a mail or a file, either for independent uses or users, or to create between these signs bonds, respective sureties, or one-off filiations. It also becomes conceivable that their presence, as much as for example their respective spatial arrangement, are bearers of an additional meaning, interpretable by all the recipients or only some, assisted or not on this occasion by the anonymization authority.

A fourth refinement with respect to the stamp of the protocol is to do with the fact that now not only communication protocols, but also protocols assigned to static data are concerned.

The anonymization authority serves as interface with the author, by allotting the stamp systems thereto, by agreeing on the meaning and the equivalence of these stamps as directives, information or values. It also agrees, with and for it, on a stable pseudonym related to the successive cryptonyms, namely these stamps, and by knowing it by its real identity. It will manage another masking of real identity, by means of polynyms.

With respect to the so-called anonymization authority, already mentioned in patent application FR 2 932 043, the present invention affords an upgrade consisting of the existence of several anonymization entities instead of just one, as well as the expression of preferences emanating from their users.

The term anonymization is employed with regard to the authority in view of the fact that the stamp that it grants functions as a cryptonym. In a particular configuration of the method according to the invention, the cryptonym generally being variable, tied to a generally invariable pseudonym, will find a broadening of its applications, in that, while unburdening the central recipient of certain knowledge such as the real identity of the author, it nonetheless safeguards in its favor an optional possibility of capitalizing on anonymized knowledge about the author, if the latter accepts it. Knowledge via the anonymization authority vouching for the author and for the particular features thereof, and capitalization attributed either to the pseudonym tied to the cryptonym inserted into the protocol of the stream, or according to the same principle to the polynyms tied to the cryptonyms.

In consequence of its refinements in regard to partitioning and channeling, the invention intentionally causes a partial or total ignorance, or an inability of access, in relation to identity elements. This partitioning logic radiates over the management of the identities. The present method can be described as a system for partitioning at one and the same time entities and identities.

A physical extension would be hardware tagging, watermarking or any form of naming of a support that could be objects, matter or real beings, for purposes of recognition, of validation of right or of status, of valorization, of membership or of dependency, of bond, of identification or of authentication without revealing an actual identity and as substitute for the latter. These postings and taggings of polynyms, of pseudonyms or of cryptonyms may merely preserve just one of their sub-parts, or other derivatives resorting for example to a coding.

The method according to the invention may be the bedrock of an anonymization or of a pseudonymization of the fledgling sphere of communicating objects. By supplementing with an additional anonymization layer, it concocts an original economic model, affording the user a guarantee of additional confidentiality, the absence of which appears to be an obstacle to the commercial flourishing of these communicating objects. It puts in place a screen between for example a so-called naming authority, perceived as omnipotent and omniscient, and a custodian of such objects desirous of his digital privacy. The fact of adding an additional layer where each actor will have one or more brand marks, also allows one or more dedicated registers of object addresses to be opened for him, and this will correspondingly diminish the number of distributable addresses. The rarity of such addresses constitutes an obstacle to the flourishing of communicating objects.

Accordingly, said additional anonymization layer will rely on what will be called a system of polynyms, in a wider acceptation than that usually admitted:

a polynym may be one and the same cryptonym granted, simultaneously or subsequently, to several authors, or to communicating objects of these authors.
   In reverse, an author will be able to have a plurality of cryptonyms that can be tied to different polynyms.

A first benefit of such a device according to the invention is to create a fuzziness zone which protects the authors' digital space, spread over a multitude of hardware supports. Wholly by relying on the cryptonym-forming stamp, inserted into the computing or communication protocols, the present invention deploys a mechanism where a recipient will no longer be able to know whether such stamp covers a single author nor whether the latter is covered only by a single stamp. This results in a greatly reduced possibility of traceability, of historicization or of profiling. Such aspect takes on great importance when too many of our communicating objects transmit complementary information about us, regarding our purchases, our movements or our domestic habits.

A second benefit is to do with the fact that the cryptonym, the central function of which in patent application FR 2 932 043 is to substitute itself functionally for the author's telecommunications identity, takes on moreover the role of a sort of prefix to the container, namely the protocol, i.e. to all or part of the content. So doing, it extends the authorized length of the total message. Which length is sometimes constrained to great brevity by the technical standards in use, and correspondingly reduces the total number of variant expressions. Situation present in the debate on the possible transition of the identifications and addresses of the packets of the IP protocol switching from IPv4 (32-bit addresses) to IPv6 (128-bit addresses), where the argument of the rarity of the IPv4 identities is recurrent. Intended to overcome this dilemma, the cryptonym is here at one and the same time a multiplier of identities as much as an identity scrambler.

The remaining part of the protocol which indicates the real identity of the author, may if necessary be prohibited functionally from access, as is the case in patent application FR 2 932 043, or toned down or curtailed by an intermediate entity, for example the anonymization authority. The latter will thereafter cause the mail to pursue its course up to the naming authority or other recipient. The utility of this intermediation being to do with the fact that the anonymization authority will be able to benefit from greater confidence on the part of the users, or indeed be created by them, by groupings of enterprises or individuals, or be placed under the control of elected representatives who do not come under other geographical jurisdictions.

What is said of a naming authority could relate to any other end addressee, just as the illustration of the method by communicating objects merely designates the main potential market for this aspect of the invention. Other applications or entities could thus be concerned, like the example of systems for electronic voting, for on-line surveys, for consumer tests, for televised audience measurement, and cataloging and inventory systems. Uses may arise in regard to archiving, indexing and classifying of data, of stock, since the principle of the polynym amounts to a tree which can be chosen not only according to criteria of privacy and invisibility but conversely of formalization of visible typologies. The addition of anonymization with logic classification still remaining possible. The polynym may equally well be random and masking as rational and indicative, or a blend of these items.

The use hereinabove of the term "prefix", in regard to a cryptonym inserted into a protocol, is not a universal description: this prime position refers to the content of the mail or of the file, but it can vary in terms of uniqueness, or spatially with respect to the remainder of the container, notably if the objective is not to anonymize an author. In the latter case, a notion of suffix or any form of characteristic marking may suit. This may be pictured as involving extending either the roots, the trunk or the branches of a tree, viz. the protocol. Several simultaneous extensions being a conceivable option.

This principle of extension finds a variant not relying on the addition of characters, but on modifications in the initial protocol which culminate in the same result of increasing the possible variants, pictured like a cryptonym which would permute characters previously present in the protocol in favor of characters unpublished up till then.

In the simplest device, the anonymization authority will be able to grant such an author one or more cryptonyms-prefixes, that will be inserted into the protocols when dispatching some of the communicating objects thereof. Simultaneously or subsequently, it will grant this or these same cryptonyms-prefixes to other authors for diverse of their own objects. The constraint then being that these prefixes are not followed or surrounded by identical strings of identification characters, which would culminate in total in doubletons.

This results in the creation of a proprietor described as virtual, who will appear as sole appointed custodian of these diverse objects.

The number of polynyms no longer being related to the substantiated number of authors, and being diminishable according to the nature, the position and the length permitted the cryptonym, defines the number of makeable virtual proprietors.

Regarding privacy, the anonymization authority will advantageously be able to serve as intermediary between a naming authority and authors such as are web surfers or communicating objects. This anonymization authority multiplying up the virtual proprietors, for the convenience of authors and users, will invert the objects of several real proprietors, will redistribute their objects to several virtual proprietors, will aggregate the objects of several real proprietors on a single virtual proprietor, while managing the obligation that this prefix is not surrounded twice by the same string of characters. It will be able to undertake permutations over time, where such an object firstly tied to such a virtual proprietor is thereafter tied to another. It will be able, in its scrambling capacity and according to an expedient of decoy or of placebo type by analogy with the medical sector, to create virtual proprietors corresponding only to objects invented for the circumstance. A polynym will be able to cover zero, one or more genuine persons; a person will be able to have zero, one or more polynyms. It will be possible for there to be fake persons and fake objects.

Acting as usefully opaque intermediary between users and a naming authority, the anonymization authority would afford a response to the recurrent anxieties born of the practices, of the weight, of the nationality or indeed of the operating opacity of certain naming authorities. Opposed to this operating opacity would be an opacity of usage and of membership. Such object which one day would appear to be related to such virtual proprietor, would the day after be related to another, with no facility to trace same, and without being able to ascertain the exact confines of the patrimony of a given real proprietor.

The distinctive sign inserted into a protocol sees, in the present invention, the variety of these uses broadened. The variable cryptonym may still remain associated with an invariable pseudonym in relation to certain interlocutors, while it will take on a masking and multiplying polynym function in relation to other interlocutors such as a naming authority.

The subject of the invention is therefore a method of checking and protecting data and identities within a communication or computing process between at least one author and at least one recipient, characterized in that said method comprises at least:

A step of allocation by an anonymization authority (4) of one and the same stamp forming a cryptonymic marking, to one or to several different authors and to their objects furnished moreover with an arbitrary identity;

A step of inserting said stamp into the communication or computing protocol associated with the data stream, by means of a stamp system, the protocol containing the identity of said author or of said object of the author or authors, and each author being able moreover to simultaneously have a plurality of different cryptonyms;

A step of reading, at at least one recipient, of said protocol by means of a reading system able to detect the presence of said stamp.

The stamp is for example distinctive sign of recognition, cryptonymic marking, correspondence of identities or polynym. This polynym is a cryptonym grantable to one or to several authors and to their objects, each author simultaneously having a plurality of cryptonyms corresponding to different polynyms.

The method uses for example a mechanism which partitions, discriminates, splits up and renders autonomous, masks, unmarks or scrambles certain subjects, certain data and certain objects, certain identities or identity coupons relating to one and the same process.

This same mechanism can also be used to channel and distribute, compose, create relationships, aggregate, demask or re-mark, certain subjects, certain data and certain objects, certain identities or identity coupons relating to one and the same process.

The stamp inserted into a protocol serves for example as extender or as modifier for an arbitrary identity present in the protocol, and allocated to a physical entity such as an object, a computing entity such as a file, a communication stream, or a virtual entity such as an avatar, as well as optionally to the author, custodian or sender thereof.

In a particular case, the cryptonym-forming stamp, inserted into a computing or communication protocol, can serve as gateway to a pseudonym. It can also serve as root common to diverse identities unified by it in a single register of polynym type.

In another particular case where the stamp is inserted into a plurality of protocols pertaining to one or more actual identities, it serves for example as common referent to create a unifier register of arbitrary identities allocated to objects, streams, files or avatars pertaining to said actual identity or identities.

In a particular implementation, the anonymization authority or the author, allocate, withdraw and change the stamps corresponding to polynyms, so as to operate permutations and redistributions within the unifier registers of arbitrary identities.

One and the same author has for example a plurality of different stamps corresponding to as many polynyms, in an exclusive manner or shared with other authors.

Several stamps, similar or different, are simultaneously possible in a mail or a file, either for independent uses or users, or to create between these signs bonds, respective sureties, or one-off filiations.

One and the same author has for example several stamps simultaneously within one and the same computing or communication protocol.

The anonymization authority transmits for example to the recipient the correspondence between such stamp corresponding to a polynym, received by the recipient, and functional directives.

In a case where the stamp corresponds to a polynym, allowing the issuing of functional directives on the part of the anonymization authority, the functional directives are, in relation to a recipient, a prohibition of access, of reading, of storage or of processing in relation to parts of the protocol or of the content of the marked stream of said stamp.

The stamp inserted into a computing or communication protocol brings about for example the unmarking, on this protocol, of the actual identity of its author or custodian, either on account of the functional role thereof of prohibition of acquisition of knowledge, or via an anonymization authority placed as intermediary with respect to the recipient and undertaking the unmarking.

In a particular mode of implementation, the anonymization authority, assisted or deputized for by a suitable device, optionally transmits the correspondence between such cryptonym, such pseudonym or such entity referenced under a polynym, and on the other hand behavioral, situational information or information pertaining to the past or to the profile of this author, for the purposes of characterizing same without necessarily transmitting either the actual identity thereof or another of the pseudonyms thereof.

BRIEF DESCRIPTION OF THE DRAWINGS

Other characteristics and advantages of the invention will become apparent with the aid of the description which follows, given in relation to appended drawings which represent.

DETAILED DESCRIPTION

Figure 1:
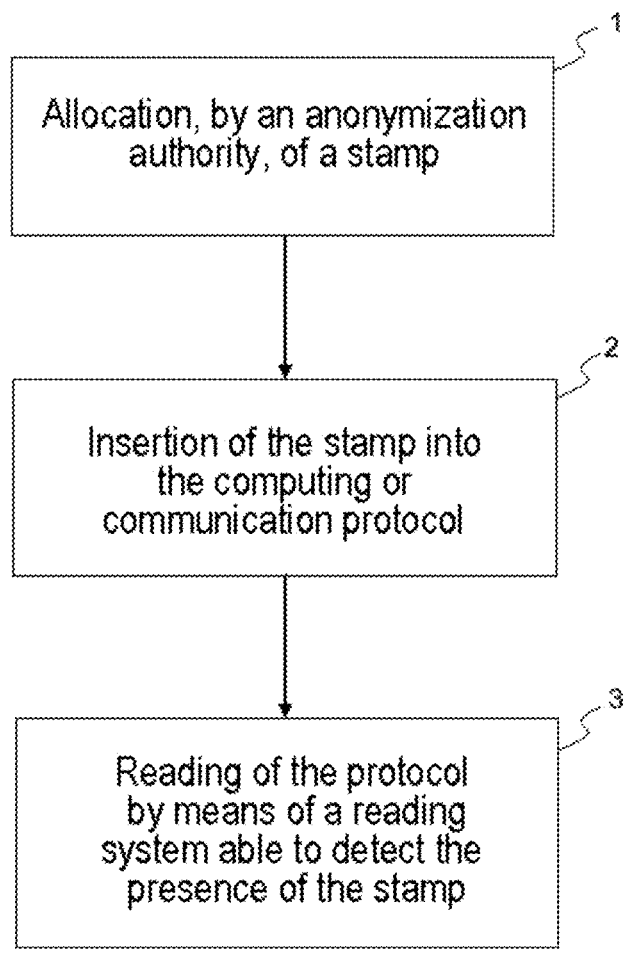
FIG. 1, the possible steps of a method according to the invention.

FIG. 1 illustrates the possible steps of a method of checking and protecting, within a communication process, according to the invention.

In a first step 1, an anonymization authority allocates one and the same stamp to one or to several different authors and to their objects which may be furnished moreover with an arbitrary identity. It being possible for this arbitrary identity to have been allocated notably by a naming authority. Each author has for example several different cryptonyms simultaneously;

In a second step 2, for the author or for each author, the insertion of this stamp into the computing or communication protocol is performed by means of a stamp system.

It is on the other hand possible to insert several similar or different stamps into one and the same protocol;

The protocol contains the identity of an object of the author. The stamp is distinctive recognition sign, cryptonymic marking, correspondence of identities or polynym. These latter are managed by at least one anonymization authority. The polynym is one and the same cryptonym grantable, simultaneously or subsequently, to one or to several authors and to their objects. Each author can have a plurality of cryptonyms corresponding to different polynyms.

In a third step 3, the reading, at at least one recipient, of the protocol is performed by means of a reading system able to detect the presence of the stamp.

The authors and the entities, or objects, may be real or dummy.

Figure 2:
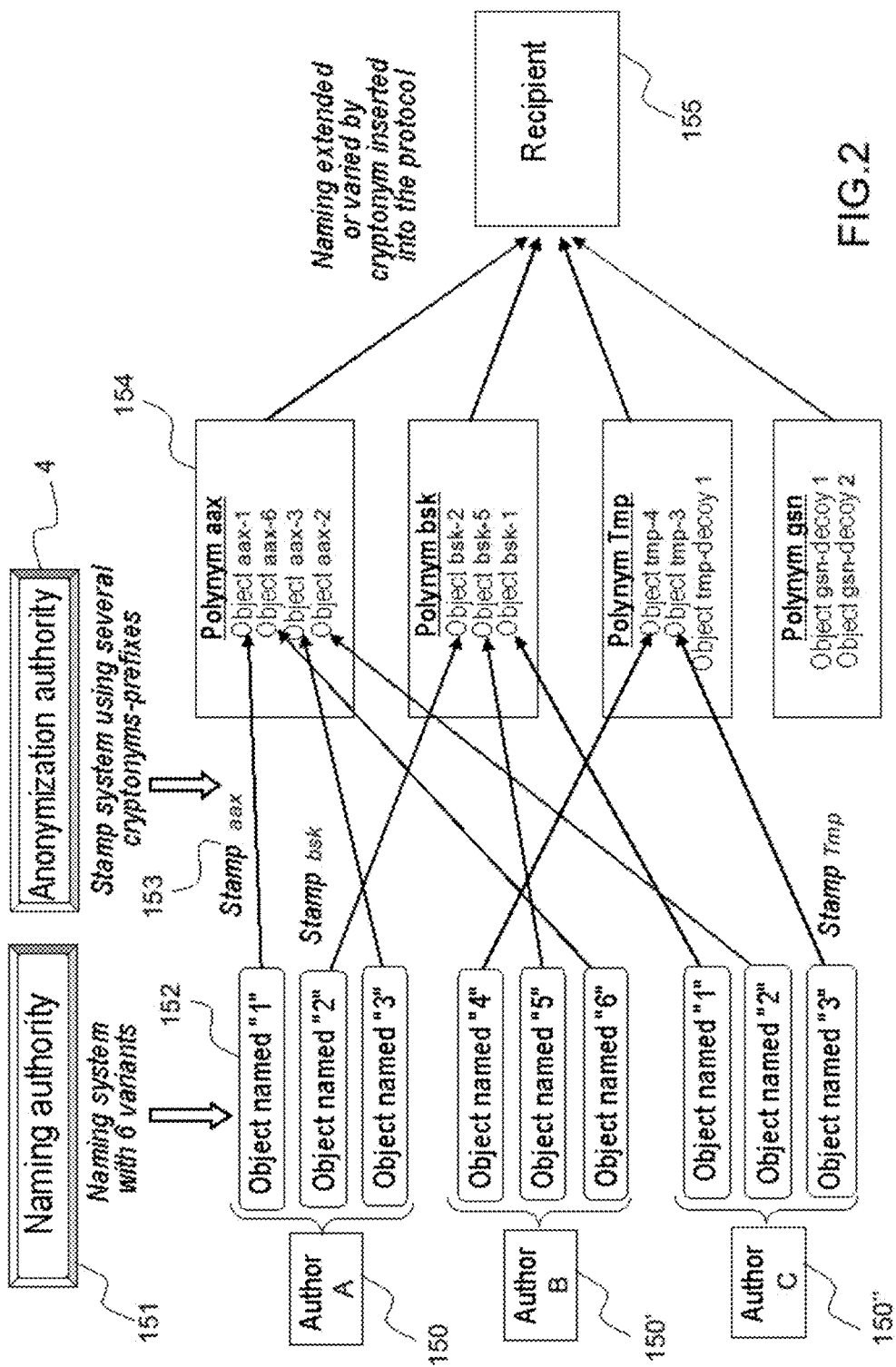
FIG. 2, an exemplary masking and diminution of identities by cryptonyms and polynyms.

FIG. 2, illustrates an exemplary masking and diminution of identities by cryptonyms and polynyms. A naming authority 151 grants identities to entities 152 such as objects, artifacts, materials, living matter, animals, persons, pertaining to an author, custodian or guardian 150, 150', 150", here in a configuration where by way of example only six possibilities of different names exist. An anonymization authority 4 grants, issues and distributes stamps 153 affixed in the computing or communication protocol of these entities. This cryptonym-forming stamp 153 comes as prefix of the identity 152 previously granted by the naming authority, or in any other spatial position culminating in particularizing it or extending it.

This so-called cryptonym-prefix makes it possible subsequently to permute the real identity of its custodian by substituting functionally therefor and by taking on a role of substitution identity under the eyes of a recipient 155 such as may be notably the initial naming authority.

An intermediate level 154 operates the transfer of apparent membership of the named and stamp bearing entities, from their real custodian to an invented custodian. This level relies on a polynyms device, where each cryptonym granted as several copies which are themselves spread over several entities pertaining to several custodians, becomes federated as a single polynym. The latter appearing henceforth to be the custodian of the entities concerned. A polynym can group together objects of diverse original proprietors, just like a real proprietor can see his entities dispersed over several polynyms. Decoy objects and decoy polynyms may be created to add to this effect of screening and effacing the patrimonies or memberships. The polynyms can vary in their content and be ephemeral.

The extension or the greater variety of the identities resulting from the affixing of a cryptonym in a protocol moreover allows the diminution of these identities. This greater variety is also to do with the fact that the cryptonym is not reducible to an adding of characters, but may be a withdrawing or any characteristic modification of the initial protocol.

Figure 3:
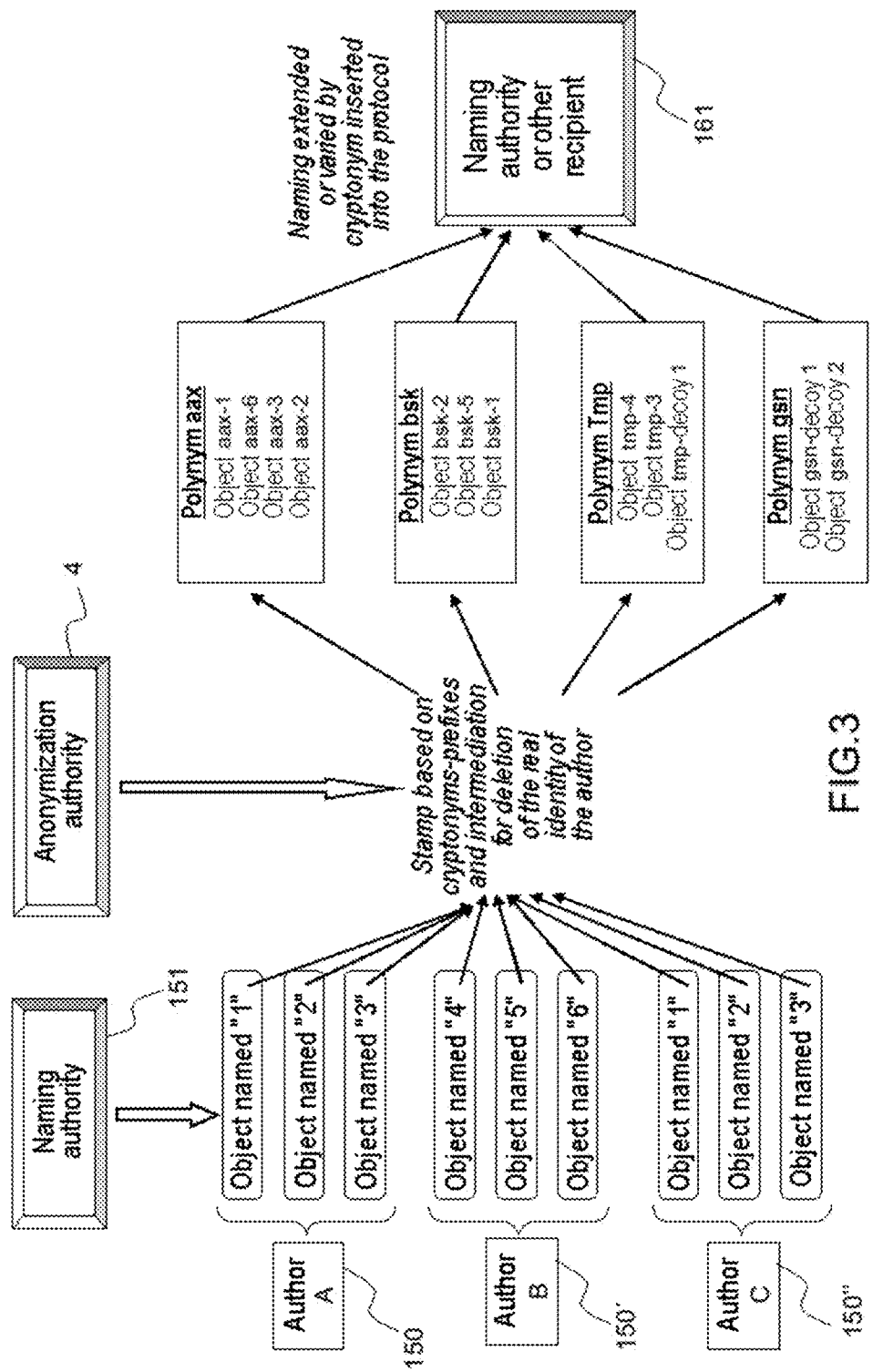
FIG. 3, an exemplary masking and diminution of identities with intermediation by an anonymization authority.

FIG. 3 illustrates an exemplary masking and diminution of identities with intermediation by the anonymization authority. An objective of masking the real identities of the entities and of their proprietor hinges around an anonymization authority 4 or around several. The latter may, in one of its configurations, be dedicated solely to this anonymization function.

This authority can intervene at one or more stages. It optionally grants, issues and distributes to interlocutors, so-called authors, the right and the means to affix cryptonym-forming stamps, in the protocol of a telecommunications dispatch or of a computer file. These stamps are furnished with a capability for functional prohibition of reading of the real identity of the author.

A recipient 161 will be equipped by the anonymization authority with a reception system able to detect and interpret the functional meaning of these stamps. In the case where the recipient is not furnished with this system or does not exhibit the deontological or material guarantees ensuring its proper compliance with this functional procedure of prohibition of reading of identity, the anonymization authority or a delegated third actor will be able to be placed as intermediary. It will be charged with deleting or rendering unusable the part of the protocol able to identify a real identity, before allowing its forwarding or its subsequent use in favor of the intended recipient.

Stamps, intermediation and effacing of real identity may intervene according to diverse sequences and at diverse locations, as a function notably of the scope of the technical functions permitted to the stamp equipment installed on or downstream of the sender author, or those of the optional black box installed on or upstream of the recipient. It may also involve a single entity and a single site, in the case where the anonymization authority is a compulsory point of transit between these diverse sender and receiver actors.

The invention claimed is:

1. A method of checking and protecting data and identities within a communication or computing process between at least one author and at least one recipient, the method comprising:

allocating, by an anonymization authority, one and the same stamp, the stamp being a distinctive sign of recognition, a cryptonymic marking, a correspondence of identity, or a polynym to the at least one author and to objects of the at least one author, wherein said polynym is a cryptonym grantable to the at least one author and to objects of the at least one author, and wherein each of the at least one authors is enabled to simultaneously have a plurality of cryptonyms corresponding to different polynyms;

inserting said stamp into the communication or computing process associated with a data stream using a stamp system, the process containing the identity of said at least one author or of said objects of the at least one author; and reading, by the at least one recipient, said communication or computing process using a reading system configured to detect the presence of said stamp.

2. The method as claimed in claim 1, wherein the anonymization authority transmits correspondence between the stamp and behavioral information, situational information or information pertaining to the past or to the profile of the at least one author, to characterize the at least one author without transmitting either the actual identity of the at least one author or another stamp of the at least one author.

3. The method as claimed in claim 1, further comprising using a mechanism to partition, discriminate, split up and render autonomous, mask, unmark or scramble subjects, data and objects, identities or identity coupons relating to the process.

4. The method as claimed in claim 1, further comprising using a mechanism to channel and distribute, compose, create relationships, aggregate, demask or re-mark, subjects, data and objects, identities or identity coupons relating to the process.

5. The method as claimed in claim 1, wherein the stamp serves as an extender or as a modifier for an arbitrary identity present in said process, and is allocated to a physical entity, the physical entity being an object, a computing entity, a file, a communication stream, a virtual entity, or an avatar.

6. The method as claimed in claim 1, wherein the stamp serves as a gateway to a pseudonym and as a root common to diverse identities unified by in a single register of polynym type.

7. The method as claimed in claim 1, wherein the stamp serves as a common referent to create a unifier register of arbitrary identities allocated to objects, streams, files or avatars pertaining to said identity.

8. The method as claimed in claim 7, wherein the anonymization authority or the at least one author, allocate, withdraw and change the stamp to operate permutations and redistributions within the unifier register of arbitrary identities.

9. The method as claimed in claim 1, wherein the at least one author has a plurality of different stamps corresponding to the same number of polynyms, in an exclusive manner or shared with other authors.

10. The method as claimed in claim 1, wherein several stamps, similar or different, are simultaneously present in an email or a file, to create bonds, respective sureties, or one-off filiations.

11. The method as claimed in claim 1, wherein the at least one author has several stamps simultaneously within the communication or computing process.

12. The method as claimed in claim 1, wherein the anonymization authority transmits to the at least one recipient correspondence between the stamp received by the at least one recipient, and functional directives.

13. The method as claimed in claim 1, wherein the stamp enables issuing of functional directives on the part of the anonymization authority, said functional directives being a prohibition of access, of reading, of storage or of processing relative to parts of the communication or computing process or of content of the data stream.

14. The method as claimed in claim 1, wherein the stamp enables unmarking of the identity of the at least one author based on a functional role of prohibition of acquisition of knowledge, or based on an anonymization authority placed as an intermediary with respect to the at least one recipient that performs the unmarking.

\* \* \* \* \*